May 16, 1933.  R. H. BROWNLEE  1,909,163
METHOD OF PRODUCING CARBON BLACK
Original Filed April 24, 1930
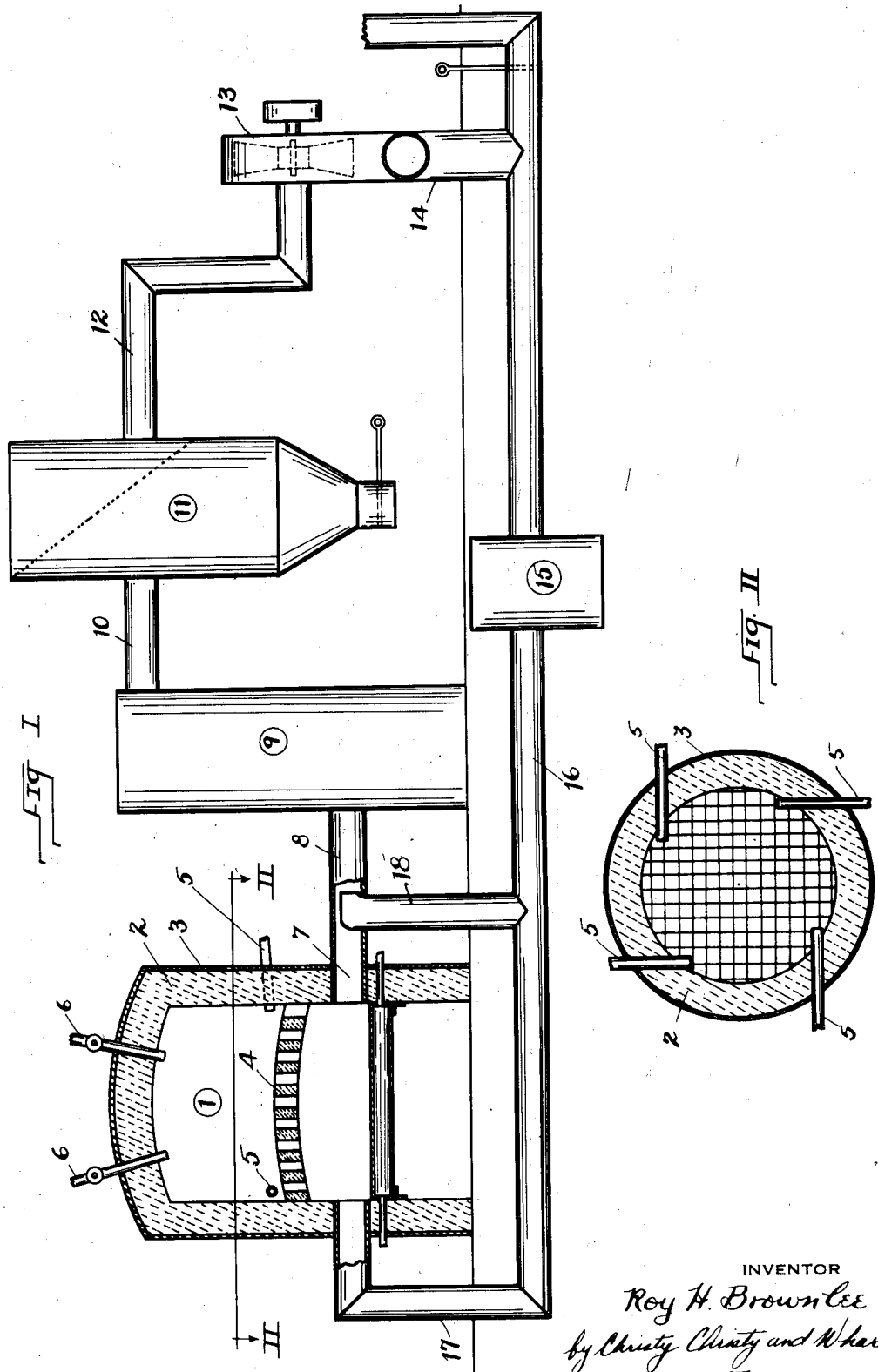
INVENTOR
Roy H. Brownlee
by Christy, Christy and Wharton
attorneys Patented May 16, 1933

1,909,163

UNITED STATES PATENT OFFICE

ROY H. BROWNLEE, OF PITTSBURGH, PENNSYLVANIA

METHOD OF PRODUCING CARBON BLACK

Application filed April 24, 1930, Serial No. 446,849. Renewed July 30, 1932.

This invention relates to a method of producing carbon black.

Within my knowledge numerous methods have been conducted, or attempted, for the production of carbon black having desirable characteristics under such circumstances as to render the methods commercially valuable. In addition to the well known method of making channel black, satisfactory results from the commercial standpoint have been obtained by passing natural gas through a furnace or retort in which checkerwork is heated to a disassociating temperature by combustion, and the gas passed through this checkerwork, the process involving the alternative heating of the checkerwork and the disassociation of the natural gas passing therethrough. The resultant product is of a grey color, is relatively non-flocculent, and is a desirable product for many purposes. Carbon black may also be made by bringing a natural gas into intimate contact with products of combustion in an inert atmosphere, by passing natural gas through decomposing tubes, and by passing the gas directly through a live flame.

I have found by experimentation certain disadvantages with all of such processes, either as to the quality of the product produced, the difficulty of conducting the process, or in the yield or efficiency of the process.

The object of my invention is to provide a process in which a highly desirable grade of carbon black is produced with relatively great efficiency, and with an adequate yield.

One form of apparatus for conducting my process is shown in the accompanying drawing, in which Fig. I is a diagrammatic view showing the decomposing furnace in vertical section and the cooling and collecting means associated with the furnace indicated diagrammatically; and Fig. II is a cross sectional view through the furnace taken on the line II—II of Fig. I.

As shown in the exemplary drawing, I may use a furnace 1 having a refractory lining 2 and an insulating shell 3. Disposed part way of the height of the furnace is a checkerwork structure 4 of relatively slight vertical extent, and arranged to be heated by gas burners 5, which introduce a combustible mixture of gas and air into the furnace. Desirably these burners are arranged with a slight downward inclination to project the combustible mixture against the upper side of the checkerwork, and are so arranged that the streams of combustible mixture have a generally tangential direction. Such positioning of the burners produces a swirling movement of the combustible mixture and flame around, and upon the upper surface of, the checkerwork 4.

Inlets 6 for hydrocarbon gas to be disassociated are arranged to deliver gas downwardly into and through the disassociation zone of the furnace, which comprises the checkerwork 4 and the sheet or layer of flame adjacent the upper surface of the checkerwork. Below checkerwork 4 is an outlet 7 from which products of decomposition in the furnace pass through outlet pipe 8 to a cooler 9. From cooler 9 a pipe 10 leads to a separator and collector 11. From separator 11 a conduit 12 leads to blower 13 for recirculation of gases separated from the solid products of decomposition carried thereby. Blower 13 passes the gases by way of conduit 14 to a refrigerator 15, and thence by way of conduit 16 and branch pipes 17 and 18 to the outlet pipe 8 leading to cooler 9 and to the furnace in a region below the disassociating zone.

It is to be understood that various other forms of apparatus may be utilized in conducting the method of the present invention. In conducting my method a combustible mixture of gas and air is introduced through burners 5, the mixture being such as to produce a substantially neutral flame. Checkerwork 4 is heated by this combustion, and the combustion described also forms a sheet or layer of frame lying upon and immediately above the checkerwork.

While still continuing combustion to maintain the temperature of the checkerwork, and to provide the sheet or layer of flame thereon, I introduce a hydrocarbon for disassociation through inlets 6, each directed downwardly through the disassociating zone of the furnace. This hydrocarbon is desirably natural gas, consisting substantially entirely of methane, but may be any suitable hydrocarbon gas or liquid capable of disassociation to release carbon. The passage of the gas through the relatively thin disassociation zone comprising the flame and checkerwork is exceedingly rapid, so that the gas and its products of decomposition are not subjected to a prolonged heating effect. A mixture of gas and carbon black passes through outlet 7 and outlet pipe 8 to the cooling, collecting, and recirculating elements of the apparatus.

The carbon black which is produced by passing the gases to be disassociated through the flame and checkerwork is of an unusually flocculent nature, and has a glossy blackness superior to that of channel black. It has an unusually and unexpectedly low apparent specific gravity.

Because of its physical characteristics my carbon black is particularly desirable for admixture with rubber, in that it is readily milled, and produces when the rubber is cured a composition of excellent wearing qualities and unimpaired resiliency. Also because of its non-granular nature and glossy blackness, it is particularly desirable for use in paints, printing ink, and similar purposes.

In passing the gas through a flame, even if such flame be substantially neutral, there is a tendency toward a state of equilibrium in the disassociating reaction involving the products of combustion and the products of disassociation. By my method of passing the gas through a live flame and through a continuously heated thin checkerwork providing a short passage, I produce substantially complete disassociation while obtaining a product of superior quality. Desirably the temperature in the disassociating zone is between 1000° centigrade and 1400° centigrade, the exact temperature being readily determined by an operator skilled in the art, with relation to the volume of gas introduced for disassociation.

I have found that within reasonable limits pressure plays no part in conducting my process. That is, the pressure within the furnace may be either at, above, or below atmospheric pressure without apparently affecting the yield or quality of the carbon black produced.

While I do not wish to confine myself to any theory of operation which results in my successful production of carbon black, it is obvious that my results are obtained by subjecting the gas to be disassociated both to the heating effect of a live flame and to the heating effect of radiant material, while maintaining an exceedingly short period of time during which the gas is subjected to the heating effect of both. I am led to believe that the action of the flame through which the gas passes causes a high molecular activity and molecular disintegration into the atomic constituents of the gas, the mixture of the gas to be disassociated with the products of combustion being momentarily in a state of chemical equilibrium. The additional heat units radiantly supplied by the checkerwork, without raising the temperature of the gaseous mixture, then serve to complete the reaction, and cause the production of pure carbon black and an impure hydrogen. Partial confirmation of this theory is found in the fact that my process results in the production of relatively small quantities of polymerization products, such as occur from prolonged heating or unduly high temperature.

It may thus be briefly stated that my disassociation process, consists in supplying a great number of heat units to the entire body of hydrocarbon gas undergoing disassociation, throughout a short period of time, and without raising the gas to an extremely high temperature at any instant.

Since the checkerwork in the disassociating zone is of short extent the unit furnaces for conducting the process may be made of relatively small size, thus effecting a great economy in the cost of construction over installations which utilize large furnaces having therein a checkerwork structure of relatively great length.

I have found that I may produce a good quality of lamp black, instead of the carbon black produced by the disassociation of a hydrocarbon gas, by employing a hydrocarbon oil as the hydrocarbon to undergo decomposition. In such case the oil may desirably be preheated prior to its introduction, or in a region of the furnace through which it passes before passing through the disassociating zone.

What I claim is:

1. The herein described method of producing carbon black by the disassociation of a hydrocarbon which comprises the provision of a relatively narrow disassociating zone by the combustion of a gas adjacent the surface of a perforate radiant sheet or layer, and passing additional gas to be disassociated through such disassociating zone during the continuance of the combustion.

2. The herein described method of producing carbon black by the disassociation of a hydrocarbon which comprises the provision of a disassociating zone by the combustion of a gas against the surface of mutually spaced radiant bodies, and passing additional gas to be disassociated through the products of combustion and through the intervals between said radiant bodies during the continuance of the combustion.

3. The herein described method of producing carbon black by the disassociation of a hydrocarbon which comprises the provision of a disassociation zone by the combustion of a gas upon the surface of radiant checkerwork arranged in a relatively thin sheet or layer and passing additional gas to be disassociated through such disassociating zone during the continuance of the combustion.

4. The process of producing carbon black from a hydrocarbon which comprises passing a hydrocarbon to be disassociated through a sheet or layer of live flame and closely adjacent a radiant surface.

5. The process of producing carbon black from hydrocarbon which comprises passing a hydrocarbon to be disassociated through a disassociation zone comprising a sheet or layer of flame with a backing of radiant material arranged to provide a short path for the hydrocarbon adjacent a radiant surface.

6. The herein described method of producing carbon black from hydrocarbon which comprises providing a disassociation zone by forming a sheet or layer of flame on a relatively thin checkerwork, and passing the hydrocarbon to be disassociated rapidly through the disassociation zone so provided.

7. The herein described method of producing carbon black by the disassociation of a hydrocarbon which comprises passing a hydrocarbon gas to be disassociated through a layer of live flame, and supplying to the gas passed through the flame heat units additional to those supplied the gas by the flame itself.

8. The herein described method of producing carbon black by the disassociation of a hydrocarbon which comprises passing a hydrocarbon gas to be disassociated through a layer of live flame, and in the uninterrupted passage of the gas causing it to flow adjacent at least one body positioned adjacent the layer of flame and serving as a reservoir of additional heat.

9. The herein described method of producing carbon black by the disassociation of a hydrocarbon which comprises the provision of a relatively narrow disassociating zone by the combustion of a gas adjacent the surface of a perforate radiant sheet or layer, passing additional gas to be disassociated through such disassociating zone during the continuance of the combustion, and lowering the temperature of the disassociation products quickly after their formation.

10. The herein described method of producing carbon black by the disassociation of a hydrocarbon which comprises the provision of a disassociating zone by the combustion of a gas against the surface of mutually spaced radiant bodies, passing additional gas to be disassociated through the products of combustion and through the intervals between said radiant bodies during the continuance of the combustion, and lowering the temperature of the disassociation products quickly after their formation.

11. The herein described method of producing carbon black by the disassociation of a hydrocarbon which comprises the provision of a disassociatitng zone by the combustion of a gas upon the surface of radiant checkwork arranged in a relatively thin sheet or layer, passing additional gas to be disassociated through such disassociating zone during the continuance of the combustion, and lowering the temperature of the disassociation products quickly after their formation.

12. The process of producing carbon black from a hydrocarbon which comprises passing the hydrocarbon to be disassociated through a sheet or layer of live flame and closely adjacent a radiant surface, and lowering the temperature of the disassociation products quickly after their formation.

13. The herein described process of producing carbon black from a hydrocarbon which comprises passing a hydrocarbon to be disassociated through a disassociation zone comprising a sheet or layer of flame with a backing of radiant material arranged to provide a short path for the hydrocarbon adjacent a radiant surface, and lowering the temperature of the disassociation products quickly after their production.

14. The herein described method of producing carbon black from a hydrocarbon gas which comprises providing a disassociation zone by forming a sheet or layer of flame on a relatively thin checkerwork, passing the gas to be disassociated rapidly through the disassociation zone so provided, and lowering the temperature of the disassociation products quickly after their formation.

15. The herein described method of producing carbon black by disassociation of hydrocarbon which comprises passing a hydrocarbon gas to be disassociated through a layer of live flame, supplying to the gas passed through the flame heat units additional to those supplied the gas by the flame itself, and lowering the temperature of the disassociation products quickly after their formation.

16. The herein described method of producing carbon black by the disassociation of a hydrocarbon which comprises passing a hydrocarbon to be disassociated through a layer of live flame in the uninterrupted passage of the hydrocarbon causing it to flow adjacent at least one body positioned adjacent the layer of flame and serving as a reservoir of additional heat, and lowering the temperature of the disassociation products quickly after their formation.

17. The herein described method of producing carbon black by the thermal disassociation of a hydrocarbon which comprises passing a hydrocarbon through flame and in immediate subjection to the heating effect of refractory heated to at least the disassociation temperature of the hydrocarbon.

18. The herein described method of producing carbon black by the thermal disassociation of a hydrocarbon which comprises passing a hydrocarbon through flame and in immediate subjection to the heating effect of refractory heated to at least the disassociation temperature of the hydrocarbon, and lowering the temperature of the disassociation products thus produced quickly after their formation.

In testimony whereof I have hereunto set my hand.

ROY H. BROWNLEE.